(12) United States Patent
Baldonado et al.

(10) Patent No.: US 8,918,838 B1
(45) Date of Patent: Dec. 23, 2014

(54) ANTI-CYBER HACKING DEFENSE SYSTEM

(71) Applicant: Oasis Technology, Inc., Camarillo, CA (US)

(72) Inventors: George Michael Baldonado, Oxnard, CA (US); Eric Lane, Ventura, CA (US)

(73) Assignee: Oasis Technology, Inc., Camarillo, CA (US)

( * ) Notice: Subject to any disclaimer, the term of this patent is extended or adjusted under 35 U.S.C. 154(b) by 0 days.

(21) Appl. No.: 14/279,230

(22) Filed: May 15, 2014

Related U.S. Application Data

(60) Provisional application No. 61/857,567, filed on Jul. 23, 2013.

(51) Int. Cl.
*H04L 9/00* (2006.01)
*H04L 29/06* (2006.01)
(52) U.S. Cl.
CPC ............ *H04L 63/20* (2013.01); *H04L 63/1408* (2013.01)
USPC .............................................................. 726/1
(58) Field of Classification Search
CPC combination set(s) only.
See application file for complete search history.

(56) References Cited

U.S. PATENT DOCUMENTS

| 8,588,067 | B2 * | 11/2013 | Cho | 370/230 |
| 2004/0008632 | A1 * | 1/2004 | Hsu et al. | 370/252 |
| 2007/0118894 | A1 * | 5/2007 | Bhatia | 726/13 |
| 2011/0072508 | A1 * | 3/2011 | Agarwal et al. | 726/13 |
| 2011/0131646 | A1 * | 6/2011 | Park et al. | 726/13 |
| 2011/0154475 | A1 * | 6/2011 | Wu | 726/13 |
| 2011/0249564 | A1 * | 10/2011 | Cho | 370/241 |

* cited by examiner

*Primary Examiner* — Beemnet Dada
(74) *Attorney, Agent, or Firm* — Brooks Acordia IP Law, PC; Pejman Yedidsion

(57) ABSTRACT

Systems, devices, and methods for performing rate limiting on a received packet based on logged packet information and rules list determination where for each packet from a set of one or more packets, packet information is logged in a data store by comparing the received packet with previously received packets. Determining if the received packet is part of an established connection or if the received packet is part of a new connection and if determined that the packet is of an established connection, then performing a set of rules on a subset of packets, if however it is determined that the packet is of a new connection, then performing the set of rules on all the received packets. Additionally, determining whether the packet is part of a created rules list and if the packet is determined to be part of a created rules list, then bypassing filtering for the packet; if however the packet is determined to not be part of a created rules list, then assigning escalating time-based IP traffic blocks against the packet.

8 Claims, 7 Drawing Sheets

ANTI-CYBER HACKING DEFENSE SYSTEM

CROSS-REFERENCE TO RELATED APPLICATIONS

This application claims priority to and the benefit of Provisional Patent Application No. 61/857,567 filed Jul. 23, 2013, the contents of which is hereby incorporated by reference herein in its entirety and for all purposes.

TECHNICAL FIELD OF ENDEAVOR

The field of the invention relates to network security systems, and more particularly, to methods and devices for providing supplemental security to a network environment.

BACKGROUND

A network in general comprises one or more devices, for example, clients and servers, where the devices are in communication with each other. Computer networks are consistently under cyber-attacks from hundreds of computers and network administrators or managers are faced with the daily task of ensuring the securing of the network, i.e., ensuring that their networks are protected against unwanted hackers and unauthorized users. Protection from these attacks may be by way of encryption schemes or using security software, e.g., firewalls, in some networks; however, these networks may still be vulnerable to unauthorized interception of packets and unauthorized entry of packets into the network. In the event that such attacks are successful, they can infect systems with malicious code and remotely control the computer by sending commands to view content or to disrupt other computers. In addition, thousands of computers, i.e., 'bots,' are currently available to churn out thousands of hack attempts per millisecond, looking to gain access to secured information in a network. During these attacks, at some point, the targeted network will submit to denial of service conditions or in some cases be compromised; either causing the network or application to crash, or worse, sensitive data information may be compromised.

Additionally, each of the millions of cyber hack attempts may also congest a company's network bandwidth until the bandwidth has reached a threshold of hack attempts thereby preventing normal business operation or transactions. In many instances, network managers seeking network security may not even be aware of such attacks and may not realize such threats exist.

SUMMARY

Embodiments may include a device comprising a processor and addressable memory, the addressable memory comprising a set of one or more rules, where the processor is configured to: for each packet from a set of one or more packets: log packet information in a data store by comparing the packet with a set of previously received packets; determine if the packet is part of an established connection or if the packet is part of a new connection based on the comparison; if determined that the packet is of an established connection, then perform a set of rules on a subset of the one or more packets, where the subset of the one or more packets may be determined based on a previously selected number of packets; if determined that the packet is of a new connection, then perform the set of rules on all the packets of the set of one or more packets; determine whether the packet is part of a created accepted rules list, where the list may be at least one of: a white list, a black list, and a custom rule list; if the packet is determined to be part of a created accepted rules list, then bypass filtering for the packet; if the packet is determined to not be part of a created accepted rules list, then assign escalating time-based internet protocol traffic blocks against the set of previously received packets; and perform rate limiting on the packet based on the logged packet information and accepted rules list determination.

Optionally, the device may be between a secured network and a source node, where the secured network may be behind a firewall and where the set of one or more packets may be generated by and originated from the source node, destined for the secured network. Additionally, the device may further comprise a data store for logging functionality and where the device may maintain a separate process to execute configuration of internet protocol traffic blocks instantly. In one embodiment, the device may further be configured to perform rate limiting on the packet based on processing a determined least processor intensive attack first, where the determination may be based on whether the packet is of a predefined official rule set or a dynamically determined rule set.

Additionally, if the packet is determined to not be part of a created accepted rules list, then the device may further be configured to: assign escalating time-based internet protocol traffic blocks against the set of previously received packets based on at least one of: internet protocol traffic patterns, detected threats by an intrusion detection system device, and packet header properties. In one embodiment, if the packet is determined to not be part of a created accepted rules list, then the device may further be configured to: assign escalating time-based internet protocol traffic blocks against the set of previously received packets further based on type of offense and volume of internet protocol traffic.

Optionally, the device may further be configured to: determine if a host of a set of hosts is a non-offending host, where the determination may be based on a query to a database for unaccepted, not established, and not related packets within a specified time window; and then de-list the determined non-offending host from an automatic black list where the host internet protocol address may be removed from the data store. In one embodiment, the determination of the non-offending host may be based on a specified amount of time passing from a last time the host sent a packet which was considered to be of an intrusion type, where the packet is considered to be of an intrusion type if the packet is determined to not be part of a created accepted rules list. Additionally, the device may further be configured to: determine if previously similar violations have been recorded from a host of the packet, where the determination may be based on if the packet is determined to not be part of a created accepted rules list; and then determine a block time for the time-based internet protocol traffic blocks based on a total number of previously recorded violations from the host. In some embodiments, the white list of the created accepted rules list may comprise a set of hosts whose packets may be sent directly to a secured network, where the black list of the created accepted rules list may comprise a set of hosts whose packets may be blocked from entering the secured network, and where the custom rule list of the created accepted rules list may comprise a set of hosts whose packets need further processing.

Embodiments may also include a method of protecting a secured network, where the method may comprise the steps (and not necessarily in this order) of: receiving, by a computing device having a processor and addressable memory, a set of one or more packets; logging packet information in a data store by comparing packets with a set of previously received packets; determining for each packet from the set of one or more received packets, if a connection is an established connection or a new connection based on the comparison; performing a set of rules on a subset of the one or more packets, if determined that the packet is of an established connection, where the subset of the one or more packets is determined based on a previously selected number of packets; performing all the set of rules for all the packets of the set of one or more packets if determined that the packet is of a new connection; determining whether the packet is part of a created accepted rules list, where the list may be at least one of: a white list, a black list, and a custom rule list; bypassing filtering for the packet, if the packet is determined to be part of a created rules list; assigning escalating time-based internet protocol traffic blocks against the set of previously received packets if the packet is determined to not be part of a created accepted rules list; and performing rate limiting on the packet based on the logged packet information and accepted rules list determination.

Embodiments may also include a system for protecting a secured network, the system comprising: a computing device, a secured network, and a source node. In this embodiment, the system is configured to protect a destination node from cyber-attacks, where the source node comprises a processor, the processor configured to: send a set of one or more packets to the secured network. Additionally, the computing device may comprise a processor and memory, the processor configured to: for each packet from the set of one or more packets received from the source node: log packet information in a data store by comparing the packet with a set of previously received packets; determine if the packet is part of an established connection or if the packet is part of a new connection based on the comparison; if determined that the packet is of an established connection, then perform a set of rules on a subset of the one or more packets; if determined that the packet is of a new connection, then perform the set of rules on all the packets of the set of one or more packets; determine whether the packet is part of a created accepted rules list; if the packet is determined to be part of a created accepted rules list, then bypass filtering for the packet; if the packet is determined to not be part of a created accepted rules list, then assign escalating time-based internet protocol traffic blocks against the set of previously received packets; and perform rate limiting on the packet based on the logged packet information and accepted rules list determination. In one embodiment, the system is further configured to monitor the packets to the secured network where the secured network comprises a processor, the processor configured to: receive the set of one or more packets based on if the packet is determined to not be part of a created accepted rules list and at the rate limited by the computing device.

BRIEF DESCRIPTION OF THE DRAWINGS

Embodiments are illustrated by way of example and not limitation in the figures of the accompanying drawing, and in which.

DETAILED DESCRIPTION

Figure 1:
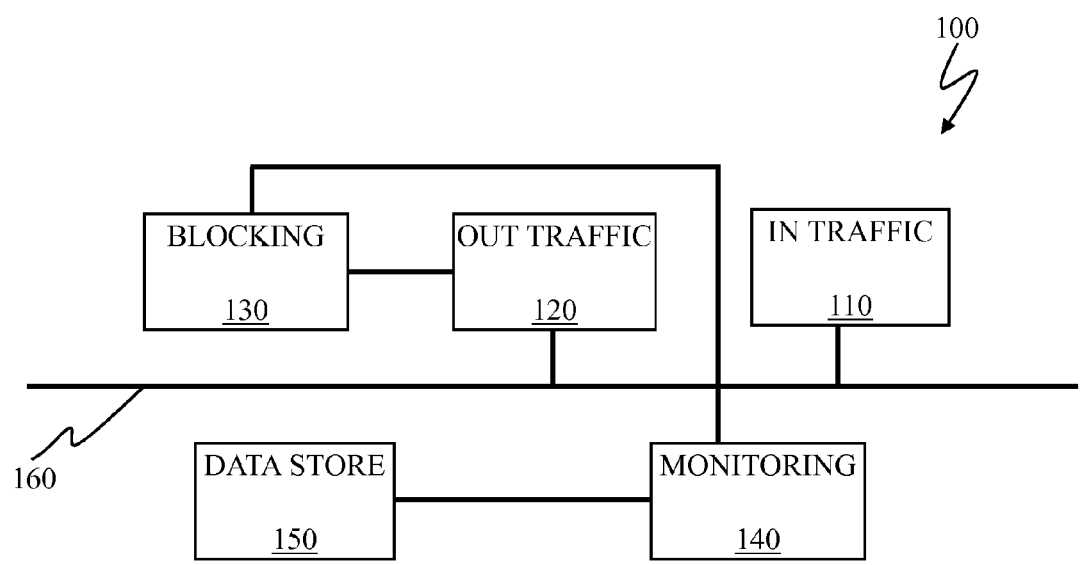
FIG. 1 depicts an exemplary embodiment of a security device.

A network security device and system is disclosed as connected to the frontend of a network to help stop the silent multi-pronged cyber hacking attempts, where the system may comprise a dynamically adjusting firewall component, an intrusion detection component, a secure remote network operations center monitoring component identified by RSA keys, and a proprietary database driven threat assessment and heuristics engine component. RSA key algorithms may involve three steps: key generation, key encryption, and key decryption. In some embodiments, the heuristics engine component may modify the dynamically adjusting firewall based on internet protocol (IP) traffic patterns and packets across a MAC Bridge standard, e.g., an 802.1d bridge, in response to threats bound for a protected IP network across the bridge. In most networked environments, packets may be delivered from a source host to a destination host based on the IP addresses of the packets. Networked environments may be implemented as a collection of devices or nodes, interconnected via a network, and may be managed by a network administrator. Networked devices or nodes may be in communication with each other within a network and the networked environment may provide secure communications therein.

In one embodiment, the heuristics engine may provide for user-configurable parameters based on protocols and ports. Additionally, the heuristics engine may assign escalating time-based IP traffic blocks against hosts propagating unwanted traffic, threats, or attempting to compromise the protected network environment based on a mixture of: IP traffic patterns, detected threats by an intrusion detection system device, and packet header properties. That is, based on an individual criteria or a group of criterion, the heuristics engine may determine how to protect the network. IP traffic blocking aims to block the network segment from which the threats or attacks originated from. In some embodiments, the database component may provide for full web-based reporting of IP traffic to the packet level, including, for example, standard IP-quad output, plus additional fields that qualify the nature and quantity of detected threats or attempts to compromise the protected network. In another embodiment, responses—in the form of database reports—may be available to events, for example, in the form of 'blacklist current' and 'blacklist history' database reports.

In some embodiments, the network security device and system may be placed between a firewall of the network and the internet, where the firewall may be any number of security schemes that functionally attempts to prevent unauthorized access to a computing device or a network of computing devices. The exemplary security device may monitor, in addition to the network security device and system, transfers of information to and from the computing device and/or the network of computing devices. In one embodiment, the heuristics engine may inspect the incoming traffic then create its own new rules to stop an intrusion. Based upon this embodiment, the network security device may also stop intrusions if the network security device senses that intrusions are due to faulty software running on the network.

An exemplary security device may comprise a processor and addressable memory where the processor and addressable memory may be configured to execute a set of instructions related to dynamic firewalls within the device. A bridging IP firewall may be capable of responding to commands received from both an intrusion detection system definition component, or module, and a heuristics component, or module. The bridging firewall may comprise common rules for known attacks and capable of performing or executing basic rate limiting functions by protocol/port quad or per host. Rate limiting may be used to control the rate of traffic sent or received by a network interface controller.

In one embodiment, the dynamic firewall may act as a bridging IP firewall capable of responding to commands from the traffic heuristics module residing on the device. The bridging capability may allow for packets to be passed through with minimal latency, i.e., negligible latency, added to the packet transmission speeds. Optionally, based on a rule set, the security device may analyze the data packets and determine whether the packets should be allowed to be passed through to the network.

The exemplary security device may comprise a definition module for Intrusion Detection System (IDS). In one embodiment, the IDS definition module may include industry-standard IDS rules, where the rules may be modified so that the system may interpolate with the traffic heuristics code module residing on the device, without interrupting genuine user traffic. In some embodiments, the IDS definition module may maintain definitions for monitoring network or system activities for malicious activities or policy violations and thereafter produce reports to a management station.

The exemplary security device may further comprise a data store, e.g., a database and logging, which may be an industry-standard traffic logging mechanism modified to work with the traffic heuristics code module residing on the device. In one embodiment, the database information may be arranged and supplemented for convenient calculations of observed traffic. The database may optionally store the IP header info of every packet and accordingly, not maintain any private data, i.e., IP packet payloads. Additionally, the security device may reside on the public side of the network and therefore, not have access to or see any private data within the secured network. That is, access may solely be limited to publicly available data thereby maintaining a high level of security and confidential data protection.

In one embodiment of the exemplary security device, the security device may comprise an IP traffic heuristics component, where the IP traffic heuristics may monitor input from intrusion detection systems residing on the device, IP traffic firewall on the device, and traffic database logging systems. In this embodiment, the IP traffic heuristics may respond by dynamically blocking offending hosts for escalating periods of time depending on the type of offense and volume and or nature of the unwanted IP traffic destined for a protected network behind the device. That is, based on the inspected sequences of packets, once the IP traffic heuristics detects an intrusion, the IP traffic heuristics may then continue to escalate time-based IP traffic blocks or other remediation strategies against categorical host or hosts from which those packets originate from or are transmit to. This may be done based on the number of intrusions received, and/or the nature or rate of packets received over a time delta in relation thereof. In one embodiment, the security device may identify and determine a pattern of intrusion packets to block and then determine a level of escalation for each detected pattern based on predefined and/or user definable rule sets. Accordingly, based on a number of intrusions for a set of packets, the IP traffic heuristics may block those packets.

In another embodiment, the security device may be designed to stop User Datagram Protocol (UDP) and Transmission Control Protocol (TCP) flooding and common IP and denial-of-service (DOS) type attacks. Flooding may occur when a denial-of-service attack (DOS attack) or distributed denial-of-service attack (DDOS attack) is attempted and as a result a network resource may become unavailable to the intended users. That is, the security device may accept all the packets received and destined for the network but not allow those packets involved in flooding or common IP attacks to be routed to the network. In this embodiment, the security device—in an effort to conserve bandwidth—may prevent the packets from entering the network and thereby the network would not need to respond to the packets. Otherwise the network may be consumed by target responses to such attacks and experience a slowdown in response times to other legitimate traffic packets.

In one embodiment of the exemplary security device, the security device comprises a control device module for initiating, controlling, and maintaining Secure Shell (SSH)-encrypted and RSA-key identified gateway port tunneling so that maintainers of the device, which may be embodied as a service, may at any time, receive network metrics from the device or control the device during routine network monitoring of protected networks. Additionally, the security device may at any time, issue supplemental dynamic firewall changes in response to detected sparse network threats, for example, special rules related to the IP addresses.

The exemplary security device may sort the blocking of the packets based on established rules where the rules may facilitate determining and processing the least processor intensive attacks first. That is, in one embodiment, the security device comprising a processor and addressable memory may perform an IDS check for any standard set of IDS rules so as to prevent those packets from entering the network. For example, the IDS check may be by way of the processor detecting trends in hacking activities, intrusion attempts, or malware and vulnerabilities based on a predefined and predetermined official rule set or alternatively based on dynamically determined rule sets. The security device may then determine, for example, via a packet analyzer hardware device that intercepts and logs traffic passing over a digital network, whether a packet is one determined to be of the rate limiting packets, and thereby prevent the packet from entering the network. Once the lesser processor intensive, i.e., basic and straightforward, rules have been executed and a packet has been determined not to be an intrusion packet, the security device may then move on to process the remaining rule sets.

In one exemplary embodiment, an attack against an un-patched Microsoft SQL Server®, a.k.a. "slammer" worm—a worm targeting a vulnerability in the MS SQL Server® 2000 Resolution Service—may be detected upon connection of the foremost UDP packets destined for the protected network on specific ports, e.g., port 1433 and/or port 1434. This rule is processed first because the less processor intensive operation of detection within one or a small number of packets allows for a relatively instantaneous block operation thereby removing the undesired conditions caused by this threat. Conversely, more expensive rules, i.e., processor intensive operation, that monitor data payloads in combination with other IP parameters; especially those that require monitoring of connection streams (operation-related succession of duplex packet communication with an outside host) are processed after the less expensive or processor intensive rules. For example, a rule that detects potential compromise attempts against a Microsoft SQL Server® failed logins requires tracking of the source host, the transaction with the server, and the server response; thereafter categorized as a match against an array of conditions pertaining to the IP conversation and inspection of the packet data to find the server response for "Invalid Login." Exemplary failed login attempts may be ones involving default user accounts for system administrators, such as: sa, administrator, password, etc. This rule may accordingly be more expensive and is processed after less expensive rules.

The sorting mechanism may produce the following: maximum resiliency to resource-consuming attacks; fast response times to a mixture of threats in prioritized order; and the most effective use of interpolated rate limiting and heuristics technologies. The device may then be made to be responsive to critical threats but resistant to attacks from a large number of hosts or that are of denial of service (DOS) nature. It has been observed that a recent trend is to distract administrators with a DOS attack thereby masking other potentially simultaneous activities that may be related to a network security compromise. The sorting mechanism of the disclosed exemplary security device allows the device to address both unwanted conditions simultaneously.

FIG. 1 depicts an exemplary embodiment of a security device 100 comprising a first connection point, e.g., a node for input traffic 110, and a second connection point, e.g., a node for output traffic 120. In some embodiments, a network node may be an active electronic device attached to a network environment, capable of sending, receiving, and/or forwarding information over a communication channel 160. For example, a communication channel may be established, via a communicative association, between a first device and a second device. In this example, a communication channel between the devices may, for example, facilitate the sharing of information data. Optionally, communication channels may be in the form of physical transmission medium, i.e., a wired communication channel; logical connection over a multiplexed medium, i.e., a radio communication channel or encapsulated packet payload or over virtual private network (VPN); and/or non-physical transmission medium, i.e., a dedicated wireless communication channel. The information data being transmitted may be received from an outside source, for example, the internet, where the security device 100 may then act as a pass-through for the received data, i.e., packets. In one embodiment, a monitoring node 140 may determine whether the packet is an intrusion packet, where the determination is based on a set of rules. The monitoring node 140 may further communicate with a data store 150, e.g., a database, where the database may perform a logging process by comparing the packets with previously received packets. In one embodiment, the monitoring node 140 may determine whether the packets are categorized as new or established. The determination of whether a packet is new or established may be done via the device kernel and network stack, and is indicated in the IP packet header as a connection state. If the packet is determined to be of the established category, that may then trigger the execution of the IDS rules for established connections. If the packet is determined to be of the new category, it may then trigger the execution of the IDS rules for new connections. The monitoring node 140 may perform the IDS rules on a set number of packets received, for example, first N number of packets, if the packet is determined to be established; otherwise all the IDS rules for new connections are checked. The monitoring node 140 may then communicate the determined results to the blocking node 130 which may then prevent the intrusion packets from entering the protected network.

Figure 2:
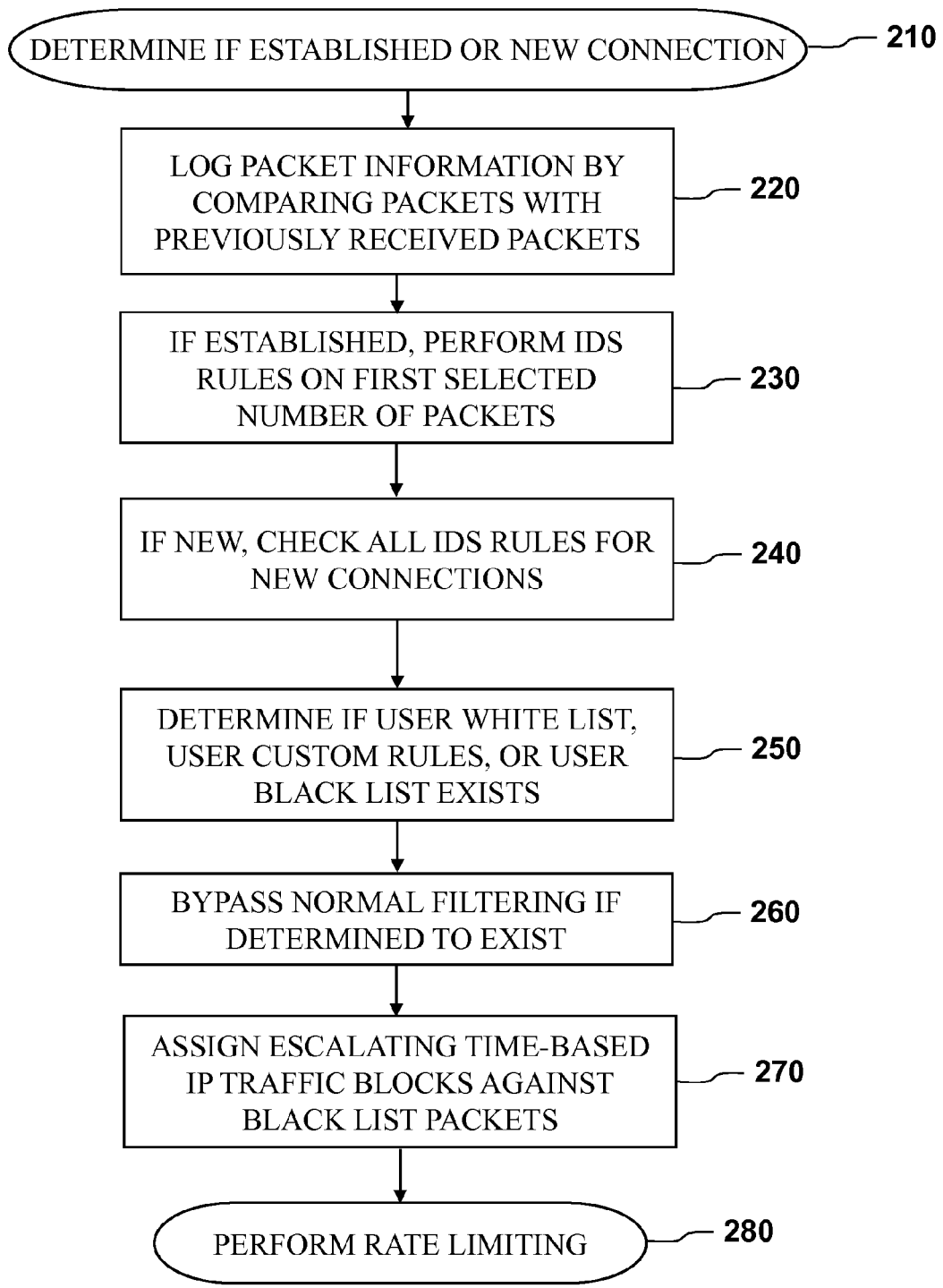
FIG. 2 is a flowchart of an exemplary security device process.

FIG. 2 is a flowchart of an exemplary security device process in which the device comprises a computer and/or computing circuitry that may be configured to execute the steps as depicted. The method depicted in the flowchart includes a device having memory and a processor executing the steps of: (a) determining if a connection is of an established connection or a new connection (step 210); logging packet information by comparing packets with previously received packets (step 220); (b) if determined that it is of an established connection, then performing IDS rules on the first set of packets, representing a previously selected number of packets (step 230); if determined that the connection is of a new connection, then checking all IDS rules for all the packets (step 240); determining whether the packet is part of a user created white list, custom rules, or black list (step 250); if determined that either a user created white list, a set of custom rules, or a black list exists, then bypassing normal filtering (step 260); assigning escalating time-based IP traffic blocks against black lists packets (step 270); and performing rate limiting on the packets being received (step 280).

Figure 3:
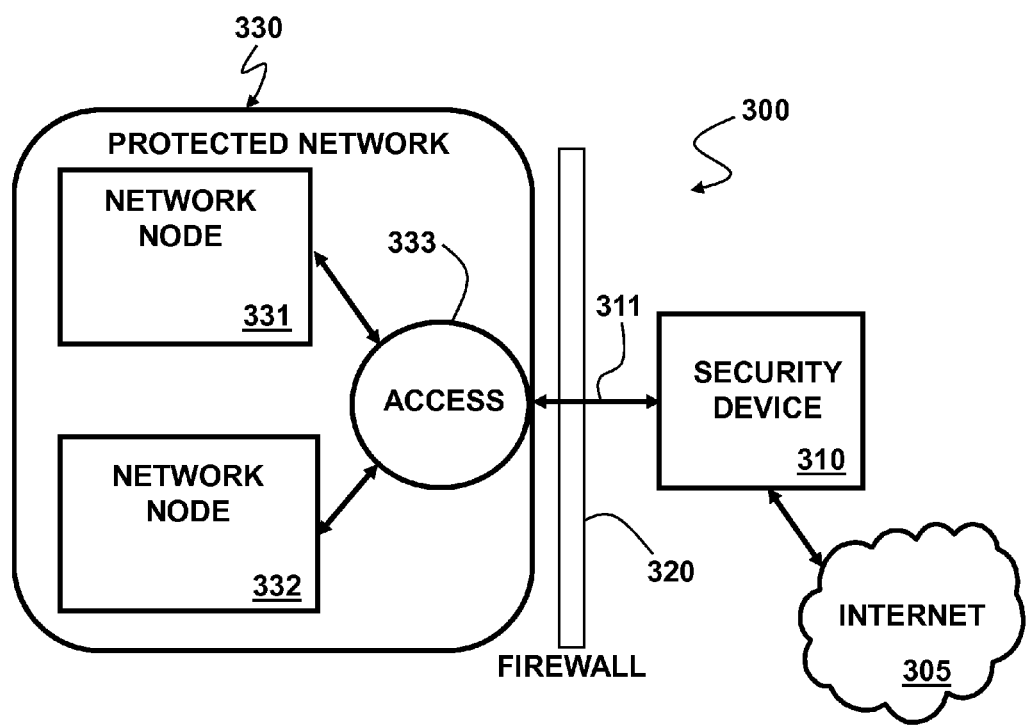
FIG. 3 depicts an exemplary embodiment of a network environment where the security device is between the internet and the protected network.

FIG. 3 depicts an exemplary embodiment of a network environment 300 where the security device 310 is between the internet 305 and a protected network 330. Optionally, a firewall 320 may be located between the security device 310 and the protected network 330. The protected network 330 may comprise an access control device 333 which receives packets forwarded or passed through the security device 310. The access control 333 may then determine which network node 331, 332 the packet is bound for in the protected network 330. In some embodiments, a first network node 331 may be prompted to send a message, e.g., an encrypted set of authentication information, to the access control 333 to establish a communication channel 311 with the security device 310. In this embodiment, the security device 310 provides a security check or audit to the protected network 330 in addition to the security policy of the protected network 330, adding further protection based upon standard security methods and procedures combined with the use of real-time live traffic data and the ability to dynamically respond to and mitigate attacks on the protected network 330 from the outside. The security device 310 may proactively protect the protected network 330 based on determined IP traffic patterns. In some embodiments, network nodes 331, 332 may reside in a protected network 330, where the network may comprise servers and clients, for example, comprised of computing devices operating in the client-server model and implemented as part of a wide area network (WAN). Optionally, network nodes 331, 332 may reside in a network where the nodes may share physical proximity on a local area network (LAN).

Figure 4:
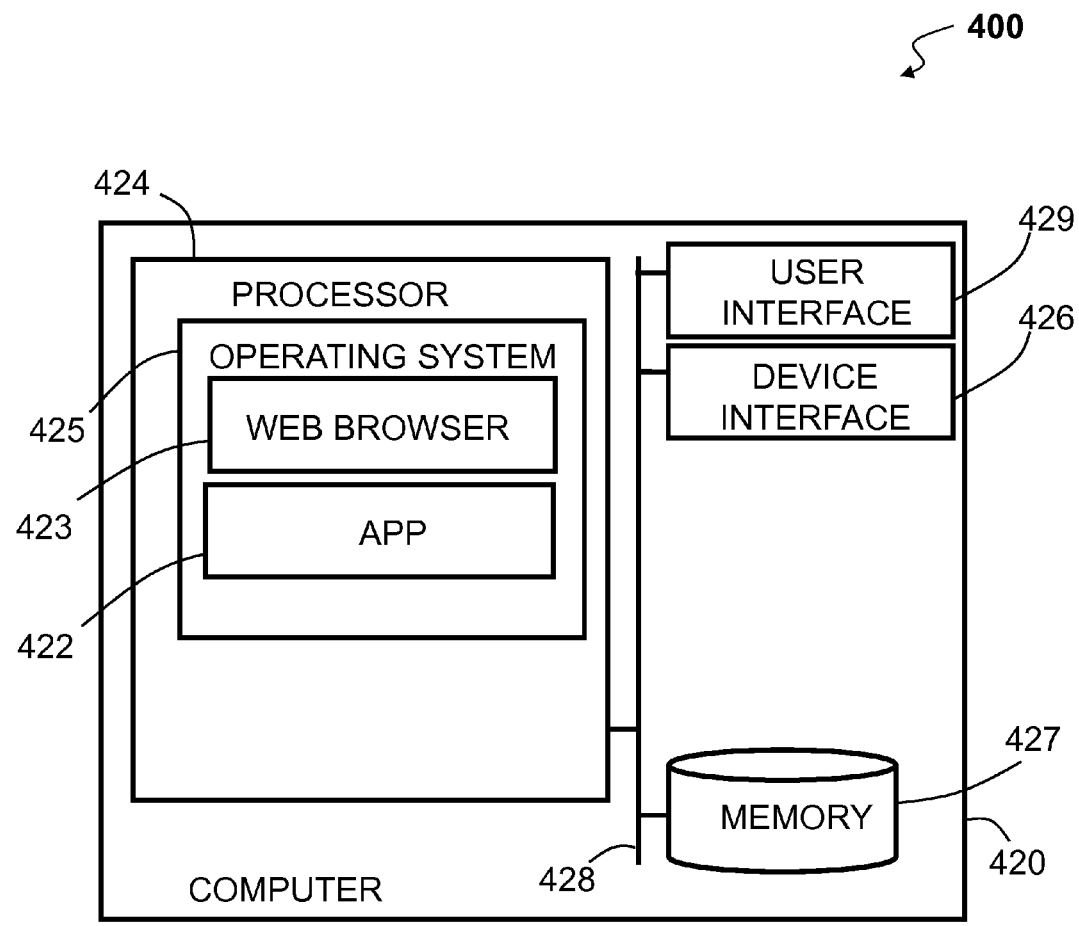
FIG. 4 illustrates an exemplary top level functional block diagram of a computing device embodiment.

FIG. 4 illustrates an exemplary top level functional block diagram of a computing device embodiment 400. The exemplary operating environment is shown as a computing device 420, i.e., computer, comprising a processor 424, such as a central processing unit (CPU), addressable memory 427 such as a lookup table, e.g., an array, an external device interface 426, e.g., an optional universal serial bus port and related processing, and/or an Ethernet port and related processing, an output device interface 423, e.g., web browser, an application processing kernel 422, and an optional user interface 429, e.g., an array of status lights, and one or more toggle switches, and/or a display, and/or a keyboard and/or a pointer-mouse system and/or a touch screen. Optionally, the addressable memory may, for example, be: flash memory, SSD, EPROM, and/or a disk drive and/or another storage medium. These elements may be in communication with one another via a data bus 428. In an operating system 425, such as one supporting an optional web browser and applications, the processor 424 may be configured to execute steps of security device configured to proactively protect a network via using real-time live traffic data to dynamically respond to and mitigate attacks and detrimental IP traffic patterns.

Figure 5:
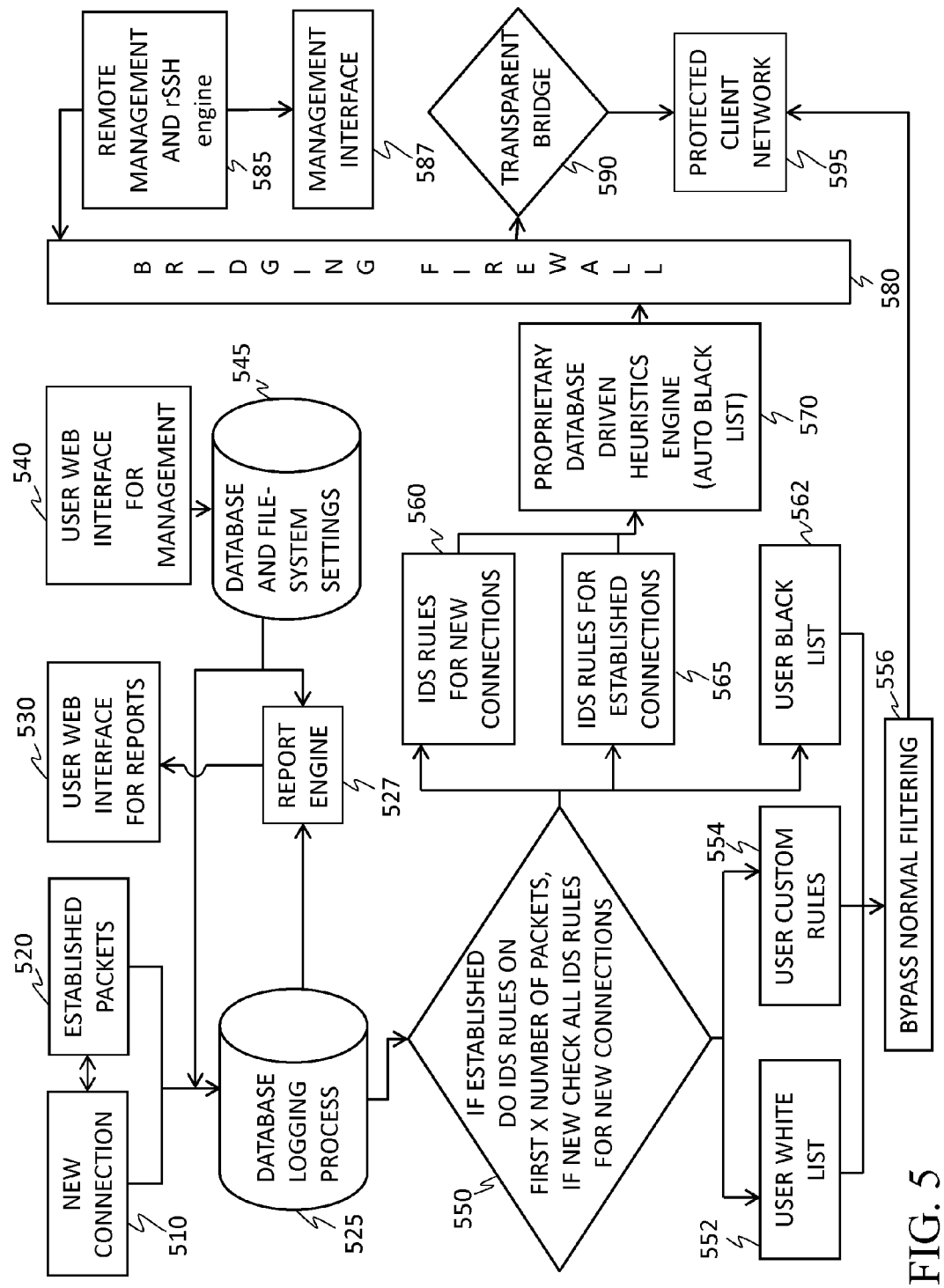
FIG. 5 is a flow chart of an exemplary top level functional process of a security device embodiment of a computing system.

FIG. 5 is a flow chart of an exemplary top level functional process of a security device embodiment of a computing system. The flow chart depicts the device as determining whether a new connection 510 is being created or a connection includes already established packets 520. Via a database logging process 525, the device may then keep track of the packets being routed through and have the ability to be queried by a report engine 527 where the report engine 527 may be responding to commands received from a user interface, for example, a user web interface, requesting a set of reports 530. The computing system may also comprise a user web interface for management 540 where the web interface may access a separate database and set of files to configure the settings 545. Using the database logging process 525, the device may then determine which rule set to execute 550. If the packets are established packets, the device may perform IDS rules on a subset of packets. If the packets are part of a new connection, then the device may check and perform all IDS rules. Upon completion of the previous determination, the device may execute a set of instructions that will access a user white list 552 and/or user custom rules 554 to determine if the packet may bypass normal filtering operation 556 and be sent directly to the protected client network. The device may then execute the IDS rules for new connections 560 and IDS rules for established connection 565 according to the previous determination. The device may also check a user defined black list 562 and execute a set of instructions that will access the black list 562 to determine if the packet should be blocked from being sent to the protected network. The IDS rules may be executed according to a proprietary database driven heuristics engine 570 that will then send the packets to a bridging firewall 580 comprising common rules for known attacks and basic rate limiting by protocol/port quad, or per host. The packets are then sent to a transparent bridge 590 via the device kernel, similar to the function of an L2 switch, for processing and sending to the protected client network 595. The system may also include a remote management and rSSH engine 585 which uses data from the bridging firewall to respond to a management interface 587 having a separate physical Ethernet port output.

Figure 6:
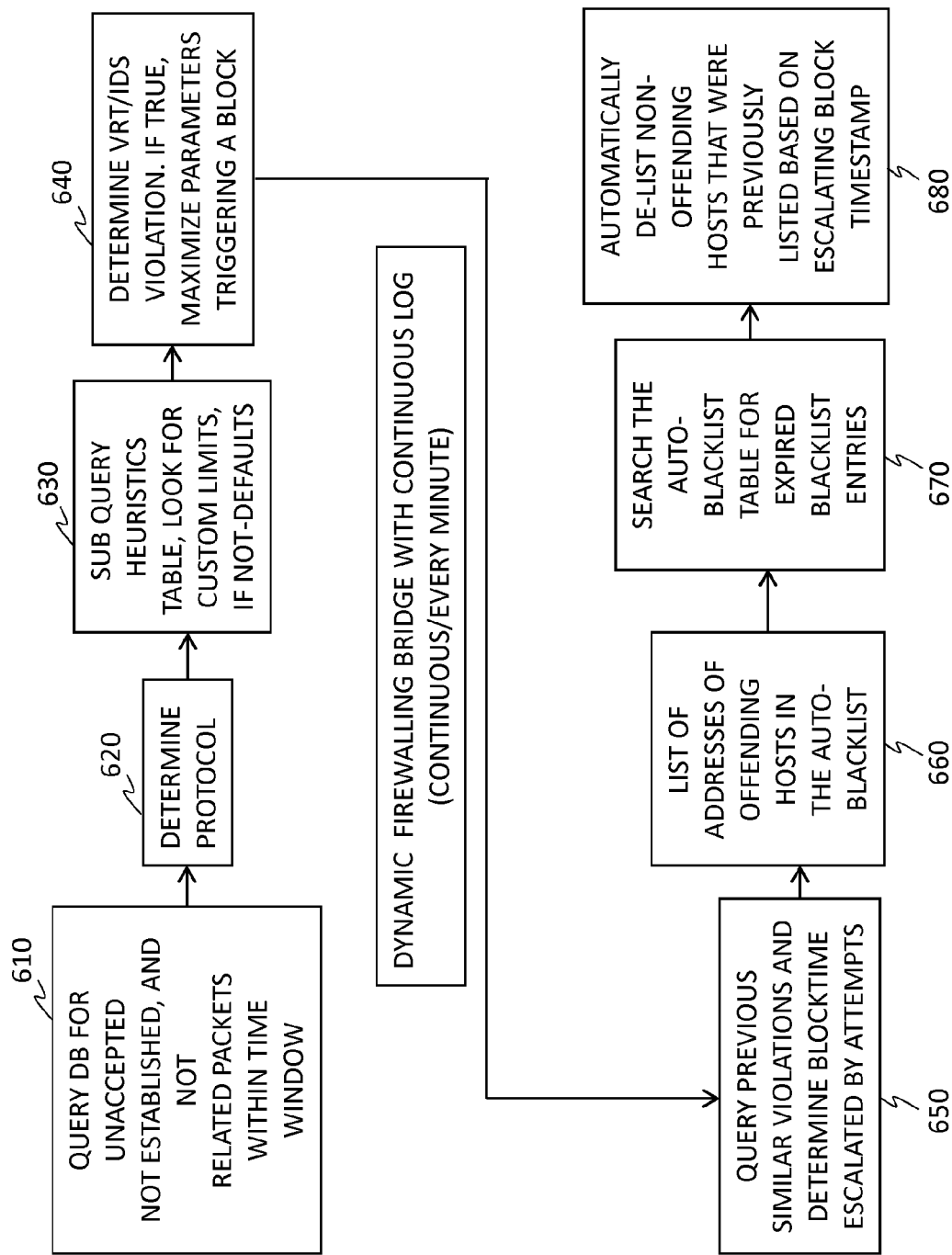
FIG. 6 depicts an exemplary flow chart of blocking triggers and de-listing of non-offending hosts.

FIG. 6 depicts an exemplary flow chart of blocking triggers and de-listing of non-offending hosts. The exemplary security device may query a database for unaccepted, not established, and not related packets within a specified time window (step 610). Once the query is made, the device may determine the protocol (step 620) and then sub query a heuristics table and look for custom limits (step 630). If not found, defaults values may be used. The device may then determine if an IDS violation has occurred, and where if it is determined that an IDS rule violation has occurred, parameters are maximized thereby triggering a block (step 640). Violation of IDS rules or other heuristics that indicate directly, or via a majority of sparse circumstances, a critical or security sensitive attack may be assigned a numerical block. The numerical block may have a value of maximum extent in the heuristics engine—thereby triggering an immediate and prioritized block. These escalations may be handled programmatically within the engine so that prioritized blocking functions and operates even while under heavy load from a potentially simultaneous DOS type attacks. The device may then query previously recorded violations that are of similar nature and determine a block-time value (step 650). At that point the device may either write to the database immediately or in subsequent cycles based on the overall load; whereas configuration of critical blocks happens instantly via a separate process and without any delays. In one embodiment, the block-time value may be escalated by the number of attempts being recorded from a host sending the intrusion packets. The exemplary device may then create a list of IP addresses associated with the offending hosts and store the list in an auto-black list, designating the IP addresses that are to be blocked by the device (step 660). The device may then continue to monitor the list and search the auto-black list table for any expired blacklist entries (step 670) given that a certain amount of time has gone by since that host has sent a packet considered to be of the intrusion type. The device may then automatically de-list, i.e., remove from the auto-black list, non-offending hosts that were previously listed based on an escalating block timestamp (step 680). Optionally, the device may query the database to delete records older than a predefined number of days from the database; additionally, the device may query the database to delete records over a predefined number of counts, i.e., to prevent flooding of the protected network database or storage on the device.

In one embodiment of the security device, the database maintenance process exists separately as an independent engine which may allow for either: (i) storage of database records—other than settings used in the operation; (ii) interpolation of on-device modules; or (iii) in the heuristics, analysis, and blocking of offending traffic. The database maintenance process may allow for the storage of log and operation data, to an established maximum number of configured days. In the event that a DOS attack occurs which has a rate of packet transmission in excess of what the database can safely store without consuming too much of the device storage, the database maintenance engine may fall back to an emergency hard coded maximum number of database records. That is, the flooding effect of a DOS attack is made to be unable to crash the database or exhaust the storage allocated for the database on the device. Further, the number of days to store and the maximum record limits are configurable by the maintainers of the device or optionally determined by the security device dynamically based on various factors, for example, the device running out of disk space or memory.

Figure 7:
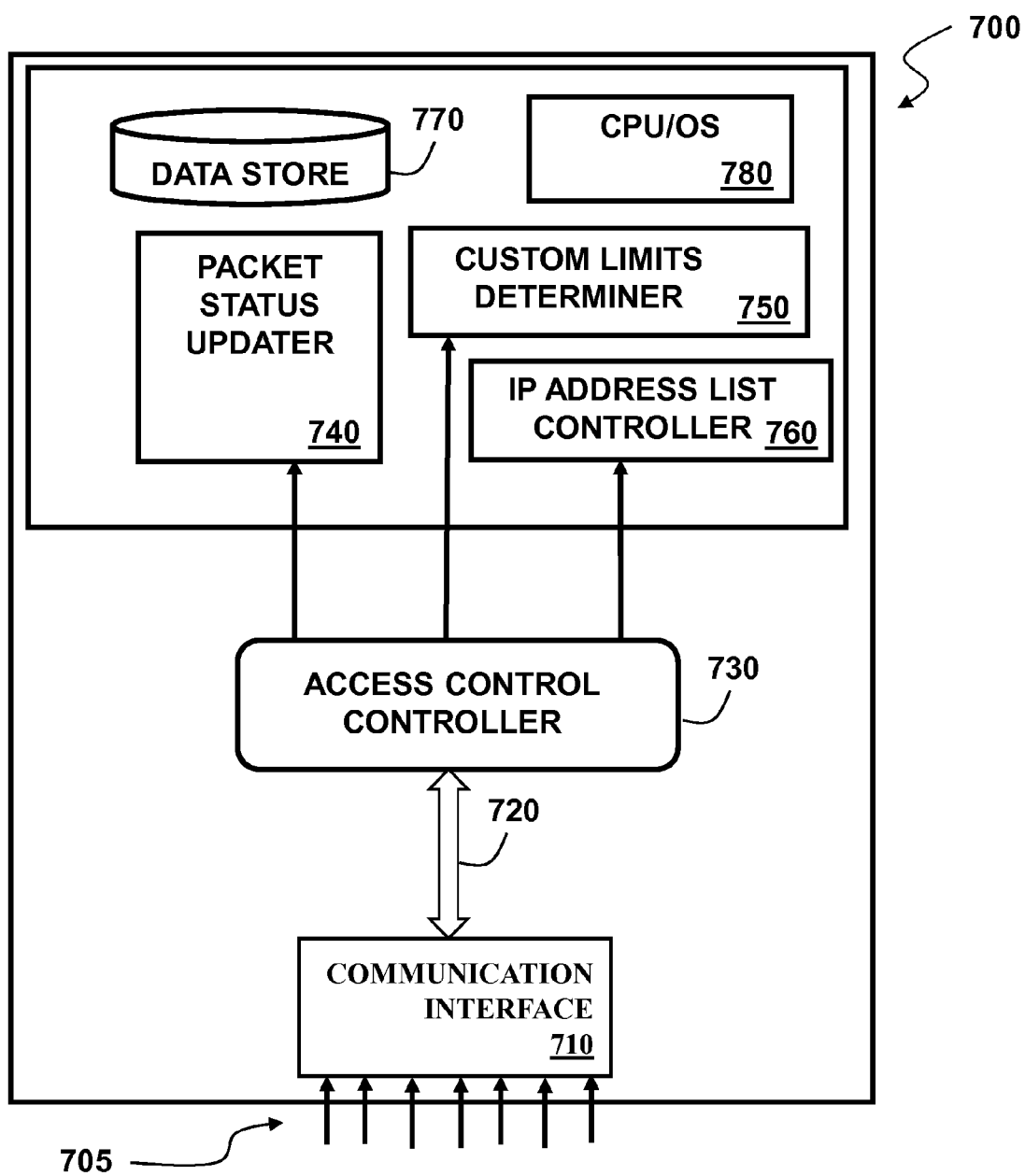
FIG. 7 depicts an exemplary top level functional block diagram of a computing device embodiment.

FIG. 7 depicts, in an exemplary top level functional block diagram, a computing device embodiment 700, i.e., the security device protecting a network. In one embodiment, formatted units of data carried by a packet mode computer network, i.e., a set of packets 705, are received by an exemplary security computing device 700 in the form of traffic data. The exemplary security computing device 700 may comprise a communication interface 710, access control controller 730, packet status updater 740, custom limits determiner 750, IP address list controller 760, data store 770, and CPU/OS 780. In an embodiment where the communication interface 710 receives a set of packets 705 from an outside host, the packets may be monitored and transmitted 720 to the access control controller 730. The access control controller 730 may then initiate a query to the packet status updater 740 to determine if a packet is from an unaccepted, not established, and not related host within a time window. Once the protocol is determined, the access control controller 730 may then sub query the custom limits determiner 750, i.e., heuristics table and engine, to look for custom limits. The exemplary security computing device 700 may then determine whether an IDS violation has occurred based on recorded information related to observed events. In one embodiment, the exemplary security computing device 700 may then increment or maximize a specified set of parameters which may then trigger a blocking based on if an IDS violation actually occurred.

In an exemplary embodiment where a denial of service attack is occurring, the device may actuate an immediate block to stop a flood of packets, either TCP or UDP. Then, as the flood of packets continues to be received over a period of time, the historical IP data and any IDS data about the nature of the threat received may be entered into the auto blacklist. Additionally, the block time may be compounded and extended by one or more violation sources; for example: the flood itself, any IDS rules triggered by the IP conversation, and the fact that the attack continues for a period of time. The "violation sources" are passed to the database as individual parameters that are then used to calculate, compound, and escalate the block time. In this manner, once a perpetually offending host is identified, the auto blacklist keeps that host from consuming unnecessary processing power on the device. This may be accomplished because the auto-blacklist is configured to effect the dropping of all packets from a host on the list until the block time expires, wherefore the host is de-listed. Dropped packets need not be subjected to processor-expensive filtering or rules.

In another example, the device may receive a combination of unwanted or suspected packets from a host attempting a dictionary attack. This is usually an attempt to compromise a secure network resource that is password protected by continually connecting to the server and testing various password combinations until a breach is achieved by trying a large number of passwords. In this example the activity may not trigger IDS or heuristics rules; however, the device may still recognize an unusually high rate of connection to the protected server from a host or hosts and a block will be triggered in the auto blacklist for this reason within a short period of time, for example, within a matter of minutes. This defense mechanism, although using a single parameter, relies on the statistical probability that a correct password will not be guessed when the number of attempts allowed before blocking a host is restricted to several hundred instead of thousands or millions. In one embodiment, the device may change the allowed base rate, i.e., amount of allowed intrusion attempts, based on the type of attack: for example, a password intrusion may be trimmed down or limited to a lower number of attempts. Since most dictionary attacks use a scripted or automated mechanism to crack passwords on remote systems, the device will continually log and analyze persistent attempts after a block is initiated and use that information to escalate the time that an offending host is blocked. In this manner the network remains protected but very minimal CPU and other resources are consumed on the device as the attack continues; that is, subsequent packets are dropped and the offending host will receive a perpetually escalating block time.

In yet another example, a host may attempt to send data to a protected network or host that triggers an IDS rule only. The heuristics engine may recognize this as an immediate attack and escalate the parameters used internally by the heuristics engine for that particular host to the maximum extent; that will in-effect trigger an immediate block. Although the activity is stopped immediately by the IDS, the addition to the auto-blacklist protects device resources from being consumed by subsequent attempts from the same host. If the host stops offending the IDS rules, then it will be delisted once the block time expires, where the time may, for example, be either five minutes from initial attempt of a single violation, or an aggregate of multiple escalated times in other cases. This combined activity of using historical packet data within a time delta in combination with IDS rules operates in a sorted fashion.

In one embodiment, the exemplary security computing device 700 continuously logs, via the data store 770 and the CPU/OS 780, the traffic data being received at the communication interface 710 intended or destined for the protected network. Accordingly, the access control controller 730 may then query the data store 770 to determine if previously similar violations have been recorded from the host of the packet and then determine a block time based on the previously recorded attempts; for example, the security device may escalate the block time with each determined attempt. The access control controller 730 may then send the IP addresses of offending hosts to the IP address list controller 760 in order for the IP address list controller 760 to record the IP address in an auto-blacklist. The auto-blacklist represents a list of offending hosts whose packets have violated the IDS rules. In one embodiment, the access control controller 730 may search the auto-blacklist table for expired blacklist entries, that is, IP addresses of hosts who have not violated the IDS rules in a specified amount of time. The access control controller 730 may then automatically de-list the determined non-offending hosts, i.e., expired blacklist entries, that were previously listed based on an escalating block timestamp-provided that no new offending packets have been transmitted after the block time was recorded for a previously-listed host. In the event that additional packets are sent by a listed host and are determined to be in violation of any processes being executed on the device, the block time will be contiguously escalated instead of expunged.

In one embodiment, a Simple Mail Transfer Protocol (SMTP) bandwidth based blocking may be employed where the security device may keep track of a total number of bytes over a fixed time period that was transacted with each source of SMTP traffic, and allows configurable dynamic blacklisting of offending sources. This would allow throttling of phishing sources using invalid addresses to search for valid accounts to spam, even if it is done over a single contiguous SMTP session. In another exemplary embodiment, an SMTP connection rate anti DDOS scheme may add a user interface function expanding on the connection-rate blocking capability that allows user-configurable blacklisting of SMTP sources based on connection rate and qualified by host range or network mask.

In one embodiment, a Remote Desktop Protocol (RDP) connection rate anti DDOS may be implemented where the security device adds a user interface function expanding on the current connection-rate blocking capability that allows user-configurable blacklisting of RDP sources based on connection rate and qualified by host range or network mask. In some exemplary embodiments, heuristics analysis reporting and configurable blocking may be included so as to allow the device to ascertain, by port and source, the rate of connections to a protected network. Additionally, the configurable blocking may allow users to configure dynamic blacklisting of connections exceeding the past history of N number of days by a configured percentage. For example, if an average of 25 per day port 110 (POP) connections were observed over the last 10 days from a specific source, and currently there are 100 connections from that source, the source would be blacklisted. This may be useful to auto-block external hosts that may have been hacked but have a trusted relationship with the protected network.

In another embodiment, a bandwidth analysis detail report may be available allowing users to observe bandwidth statistics over a time period for a protected network. Additionally, a connection health monitoring report may be provided to make available uptime data to the user on a timeline so that the quality of a protected network's internet access can be automatically monitored and delivered to users in a concise format; this may be useful for identifying ISP issues. Other embodiments provide the ability to withstand or control a barrage of attempts that number in the millions per hour. Additionally, network managers are presented with a user interface and functionality that provide ease of network management. That is, setup of the systems to prevent such attacks is of a low complexity and provides minimal necessity of time and expense.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. It is contemplated that various combinations and/or sub-combinations of the specific features, systems, methods, and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A device comprising:
a processor and addressable memory, the addressable memory comprising a set of one or more rules,
wherein the processor is configured to:
for each packet from a set of one or more packets:
log packet information in a data store by comparing the packet with a set of previously received packets;
determine if the packet is part of an established connection or if the packet is part of a new connection based on the comparison;
if determined that the packet is of an established connection, then perform a set of rules on a subset of the one or more packets, wherein the subset of the one or more packets is determined based on a previously selected number of packets;
if determined that the packet is of a new connection, then perform the set of rules on all the packets of the set of one or more packets;
determine whether the packet is part of a created accepted rules list, wherein the list is at least one of: a white list, a black list, and a custom rule list;
if the packet is determined to be part of a created accepted rules list, then bypass filtering for the packet;
if the packet is determined to not be part of a created accepted rules list, then assign escalating time-based internet protocol traffic blocks against the set of previously received packets based on: type of offense, volume of internet protocol traffic, and at least one of: internet protocol traffic patterns, detected threats by an intrusion detection system device, and packet header properties; and
perform rate limiting on the packet based on the logged packet information and accepted rules list determination,
wherein the device is between a secured network and a source node, wherein the secured network is behind a firewall, and wherein the set of one or more packets is generated by and originated from the source node, destined for the secured network.

2. The device of claim 1 wherein the device further comprises a data store for logging functionality and wherein the device maintains a separate process to execute configuration of internet protocol traffic blocks instantly.

3. The device of claim 1 wherein the device is further configured to perform rate limiting on the packet based on processing a determined least processor intensive attack first, wherein the determination is based on whether the packet is of a predefined official rule set or a dynamically determined rule set.

4. The device of claim 1 further configured to:
determine if previously similar violations have been recorded from a host of the packet, wherein the determination is based on if the packet is determined to not be part of a created accepted rules list; and
determine a block time for the time-based internet protocol traffic blocks based on a total number of previously recorded violations from the host.

5. The device of claim 1 wherein the white list of the created accepted rules list comprises a set of hosts whose packets are sent directly to a secured network, wherein the black list of the created accepted rules list comprises a set of hosts whose packets are blocked from entering the secured network, and wherein the custom rule list of the created accepted rules list comprises a set of hosts whose packets need further processing.

6. A method comprising:
receiving, by a computing device having a processor and addressable memory, a set of one or more packets;
logging, by the computing device, packet information in a data store by comparing packets with a set of previously received packets;
determining, by the computing device, for each packet from the set of one or more received packets, if a connection is an established connection or a new connection based on the comparison;
performing, by the computing device, a set of rules on a subset of the one or more packets, if determined that the packet is of an established connection, wherein the subset of the one or more packets is determined based on a previously selected number of packets;
performing, by the computing device, all the set of rules for all the packets of the set of one or more packets if determined that the packet is of a new connection;
determining, by the computing device, whether the packet is part of a created accepted rules list, wherein the list is at least one of: a white list, a black list, and a custom rule list;
bypassing, by the computing device, filtering for the packet, if the packet is determined to be part of a created rules list;
assigning, by the computing device, escalating time-based internet protocol traffic blocks against the set of previously received packets based on: type of offense, volume of internet protocol traffic, and at least one of: internet protocol traffic patterns, detected threats by an intrusion detection system device, and packet header properties, if the packet is determined to not be part of a created accepted rules list; and
performing, by the computing device, rate limiting on the packet based on the logged packet information and accepted rules list determination,
wherein the computing device is between a secured network and a source node, wherein the secured network is behind a firewall and wherein the set of one or more packets is generated by and originated from the source node, destined for the secured network.

7. The method of claim 6 further comprising:
determining, by the computing device, if previously similar violations have been recorded from a host of the packet, wherein the determination is based on if the packet is determined to not be part of a created accepted rules list; and
determining, by the computing device, a block time for the time-based internet protocol traffic blocks based on a total number of previously recorded violations from the host.

8. A system comprising a computing device, a secured network, and a source node, wherein the computing device is between the secured network and the source node, wherein the secured network is behind a firewall and:
  wherein the source node comprises a processor, the processor configured to:
    send a set of one or more packets to the secured network and wherein the set of one or more packets is generated by and originated from the source node, destined for the secured network;
  wherein the computing device comprises a processor and memory, the processor configured to:
    for each packet from the set of one or more packets received from the source node:
      log packet information in a data store by comparing the packet with a set of previously received packets;
      determine if the packet is part of an established connection or if the packet is part of a new connection based on the comparison;
      if determined that the packet is of an established connection, then perform a set of rules on a subset of the one or more packets;
      if determined that the packet is of a new connection, then perform the set of rules on all the packets of the set of one or more packets;
      determine whether the packet is part of a created accepted rules list;
      if the packet is determined to be part of a created accepted rules list, then bypass filtering for the packet;
      if the packet is determined to not be part of a created accepted rules list, then assign escalating time-based internet protocol traffic blocks against the set of previously received packets based on: type of offense, volume of internet protocol traffic, and at least one of: internet protocol traffic patterns, detected threats by an intrusion detection system device, and packet header properties; and
      perform rate limiting on the packet based on the logged packet information and accepted rules list determination; and
  wherein the secured network comprises a processor, the processor configured to:
    receive the set of one or more packets based on if the packet is determined to be part of a created accepted rules list and at the rate limited by the computing device.

* * * * *